US011368952B2

(12) United States Patent
Freed et al.

(10) Patent No.: US 11,368,952 B2
(45) Date of Patent: Jun. 21, 2022

(54) LOW-POWER NETWORK NODE FOR A LOW-POWER, WIDE AREA (LPWA) INTERNET OF THINGS (IOT) SYSTEM

(71) Applicant: SmartConnect Solutions, LLC, League City, TX (US)

(72) Inventors: David Freed, Winnetka, IL (US); Christopher Posey, Pensacola Beach, FL (US); Robert Tepp, Friendswood, TX (US); Ilya Kovnatsky, Southampton, PA (US); Daniel Richard Wisniewski, Pearland, TX (US)

(73) Assignee: SmartConnect Solutions, LLC., League City, TX (US)

( * ) Notice: Subject to any disclaimer, the term of this patent is extended or adjusted under 35 U.S.C. 154(b) by 89 days.

(21) Appl. No.: 16/702,367

(22) Filed: Dec. 3, 2019

(65) Prior Publication Data

US 2020/0178250 A1    Jun. 4, 2020

Related U.S. Application Data

(60) Provisional application No. 62/877,498, filed on Jul. 23, 2019, provisional application No. 62/877,509, (Continued)

(51) Int. Cl.
*H04W 72/04* (2009.01)
*H04W 56/00* (2009.01)
(Continued)

(52) U.S. Cl.
CPC ... *H04W 72/0446* (2013.01); *H04W 56/0015* (2013.01); *H04W 72/085* (2013.01); *H04W 84/18* (2013.01); *H04W 88/16* (2013.01)

(58) Field of Classification Search
CPC ...... H04W 84/18; H04W 88/16; H04W 8/005
See application file for complete search history.

(56) References Cited

U.S. PATENT DOCUMENTS

| 10,015,802 | B2 | 7/2018 | Matischek et al. |
| 2004/0047314 | A1* | 3/2004 | Li .......... H04B 7/2612 370/335 |

(Continued)

FOREIGN PATENT DOCUMENTS

| WO | 2018183789 | A1 | 10/2018 | |
| WO | WO-2018183789 | A1 * | 10/2018 | ......... H04L 67/1004 |

OTHER PUBLICATIONS

International Search Report and Written Opinion from corresponding International Appl. No. PCT/US2019/064306, dated Feb. 27, 2020.

*Primary Examiner* — Ayanah S George
(74) *Attorney, Agent, or Firm* — Womble Bond Dickinson (US) LLP

(57) ABSTRACT

A gateway includes memory configured to store computer-readable program code; and processing circuitry configured to access the memory and execute the computer-readable program code. The gateway is connected or connectable to a low-power wide area (LPWA) network. The gateway is caused to transmit a common timing reference at a constant interval that delineates an epoch including timeslots assignable to network nodes and a free-for-all interval. The gateway is also caused to join a network node to the LPWA network based on the common timing reference and is further caused to receive a join message including a measure of received signal strength or quality of the common timing reference at the network node. The gateway is also caused to assign one or more timeslots within the epoch, a frequency, (Continued)

a channel, or a modulation to the network node based on the measure of received signal strength or other quality.

35 Claims, 7 Drawing Sheets

Related U.S. Application Data filed on Jul. 23, 2019, provisional application No. 62/774,374, filed on Dec. 3, 2018.

(51) Int. Cl.
*H04W 72/08* (2009.01)
*H04W 84/18* (2009.01)
*H04W 88/16* (2009.01)

(56) References Cited

U.S. PATENT DOCUMENTS

| | | | |
|---|---|---|---|
| 2010/0124886 A1* | 5/2010 | Fordham | H04B 17/382 455/67.11 |
| 2010/0144363 A1* | 6/2010 | De Rosa | H04W 52/0206 455/452.1 |
| 2017/0244537 A1* | 8/2017 | Yu | H04L 5/0094 |
| 2017/0273094 A1* | 9/2017 | Cheng | H04W 72/1247 |
| 2020/0314891 A1* | 10/2020 | Li | H04W 16/14 |
| 2020/0396774 A1* | 12/2020 | Thota | H04J 13/102 |
| 2020/0396775 A1* | 12/2020 | Paycher | H04W 76/10 |

* cited by examiner

LOW-POWER NETWORK NODE FOR A LOW-POWER, WIDE AREA (LPWA) INTERNET OF THINGS (IOT) SYSTEM

CROSS-REFERENCE TO RELATED APPLICATIONS

The present application claims priority to U.S. Provisional Patent Application No. 62/774,374, entitled: Low-Power, Wide-Area (LPWA) Internet Of Things (IoT) System, filed on Dec. 3, 2018; U.S. Provisional Patent Application No. 62/877,509, entitled: Low-Power, Wide-Area (LPWA) Internet Of Things (IoT) System, filed on Jul. 23, 2019; and U.S. Provisional Patent Application No. 62/877,498, entitled: Low-Power Network Node For A Low-Power, Wide Area (LPWA) Internet Of Things (IoT) System, filed on Jul. 23, 2019, each of which is herein incorporated by reference.

TECHNOLOGICAL FIELD

The present disclosure relates generally to low-power networking and, in particular, a low-power network node for a low-power, wide area (LPWA) Internet of things (IoT) system that uses time division multiplexing.

BACKGROUND

The present disclosure relates generally to low-power networking and, in particular, a low-power network node for a low-power, wide area (LPWA) Internet of things (IoT) system that uses time division multiplexing (TDM). This is because typical long-range (LoRa) implementations have leveraged iterations of LoRa Wide Area Network (LoRaWAN) technology at the datalink and network layers. Conventional LoRaWAN implementations are based on the ALOHA network architecture commonly known as "spray-and-pray" because of the lack of coordination between nodes and the central gateway. While effective for low bandwidth implementations or limited nodes on the network, increasing bandwidth or the number of nodes will cause significant data loss due to overlapping packets. As a result, conventional LoRaWAN and LPWA IoT systems may have data losses of up to 60-80%. These systems require sending repeat transmissions with significant frequency, thereby negatively affecting the power consumption, throughput, performance, and battery life of network nodes.

Therefore, it would be desirable to have a system and method that takes into account at least some of the issues discussed above, as well as other possible issues.

BRIEF SUMMARY

Example implementations of the present disclosure are directed to a low-power network node for a low-power, wide area (LPWA) Internet of things (IoT) system that uses time division multiplexing (TDM). The LPWA IoT system and low-power network nodes may be suitable for any of a number of applications, such as tracking tagged objects. performance such as time-on-tool or other similar metrics. The nodes (also referred to as tags) may be connected to applications or algorithms and may be read by gateways or relays throughout the LPWA IoT system.

The present disclosure thus includes, without limitation, the following example implementations.

Some example implementations provide A gateway connected or connectable to a low-power wide-area (LPWA) network, the gateway comprising: memory configured to store computer-readable program code; and processing circuitry configured to access the memory and execute the computer-readable program code to cause the gateway to at least: transmit a common timing reference at a constant interval that delineates an epoch including timeslots assignable to network nodes for transmission of data and further including a free-for-all interval during which any network node is permitted to transmit data; and join a network node to the LPWA network based on the common timing reference, including the gateway caused to: receive a join message transmitted by the network node during the free-for-all interval, the join message including a measure of received signal strength or quality of the common timing reference at the network node, and assign one or more timeslots within the epoch, a frequency, a channel, or a modulation to the network node based on the measure of received signal strength or other quality as may be configured by the gateway.

In some example implementations of the gateway of any preceding example implementation, or any combination of any preceding example implementations, the processing circuitry is configured to execute the computer-readable program code to cause the gateway to further: evict the network node from the timeslot assigned to the network node after a predetermined timeout period in which the network node fails to transmit data in the timeslot.

In some example implementations of the gateway of any preceding example implementation, or any combination of any preceding example implementations, the processing circuitry is configured to execute the computer-readable program code to cause the gateway to further: assign an additional timeslot to the network node in response to a notification from the network node.

In some example implementations of the gateway of any preceding example implementation, or any combination of any preceding example implementations, the processing circuitry is configured to execute the computer-readable program code to cause the gateway to further: evict the network node from the additional timeslot assigned to the network node after a predetermined timeout period in which the network node fails to transmit data in the additional timeslot.

In some example implementations of the gateway of any preceding example implementation, or any combination of any preceding example implementations, the processing circuitry is configured to execute the computer-readable program code to cause the gateway to further: join an additional network node to the LPWA network, including the gateway caused to: receive an additional join message transmitted by the additional network node during the free-for-all interval, the additional join message including an additional measure of received signal strength or quality of the common timing reference at the additional network node, determine all of the timeslots assignable to the network nodes are assigned, create an additional epoch including additional timeslots assignable to the network nodes for transmission of data, and assign one or more timeslots within the additional epoch, a frequency, a channel, or a modulation to the additional network node.

In some example implementations of the gateway of any preceding example implementation, or any combination of any preceding example implementations, the processing circuitry is configured to execute the computer-readable program code to cause the gateway to further: dynamically adjust the free-for-all interval based on an amount of data transmitted in respectively the timeslots and the free-for-all interval of the epoch.

In some example implementations of the gateway of any preceding example implementation, or any combination of any preceding example implementations, a portion of the free for all interval is be dedicated to downstream data and another portion of the free for all interval is dedicated to upstream data, and when transmission of downstream data stops during the portion of the free for all interval, any remaining part of the portion is used by any of the network nodes to transmit upstream data.

In some example implementations of the gateway of any preceding example implementation, or any combination of any preceding example implementations, the processing circuitry is configured to execute the computer-readable program code to cause the gateway to further: allow certain ones of the network nodes to transmit data during an entirety of the epoch; and limit other of the network nodes to transmit data during other regular or irregular intervals of the epoch.

In some example implementations of the gateway of any preceding example implementation, or any combination of any preceding example implementations, the processing circuitry is configured to execute the computer-readable program code to cause the gateway to further: implement the common timing reference between all of the network nodes.

In some example implementations of the gateway of any preceding example implementation, or any combination of any preceding example implementations, the data is encrypted based on a unique identifier of the network node, and the unique identifier facilitates accurate routing within the network and a temporary connection identifier is assigned to the network node by the gateway based on the unique identifier.

In some example implementations of the gateway of any preceding example implementation, or any combination of any preceding example implementations, receive an eviction command from a server computer based on other requirements for network performance.

Some example implementations provide a network node for a low-power wide-area (LPWA) network, the network node comprising: memory configured to store computer-readable program code; and processing circuitry configured to access the memory and execute the computer-readable program code to cause the network node to at least: receive a common timing reference from a gateway connected to the LPWA network, the gateway configured to transmit the common timing reference at a constant interval that delineates an epoch including timeslots assignable to network nodes for transmission of data and further including a free-for-all interval during which any network node is permitted to transmit data; join the network node to the LPWA network based on the common timing reference, including the network node caused to: send a join message or other high-priority message to the gateway during the free-for-all time interval, the join message including a measure of received signal strength or quality of the common timing reference at the network node, and receive assignment of one or more timeslots within the epoch, a frequency, a channel, or a modulation from the gateway configured to assign the timeslot, the frequency, the channel, or the modulation based on the measure of received signal strength or other quality as configured by the gateway; and transmit data in the timeslot, and at the frequency, the channel, or the modulation assigned to the network node.

In some example implementations of the network node of any preceding example implementation, or any combination of any preceding example implementations, the processing circuitry is configured to execute the computer-readable program code to cause the network node to further: receive a notification of eviction of the network node from the timeslot assigned to the network node after a predetermined timeout period in which the network node fails to transmit data in the timeslot.

In some example implementations of the network node of any preceding example implementation, or any combination of any preceding example implementations, the processing circuitry is configured to execute the computer-readable program code to cause the network node to further: send a notification to the gateway of a transmission of data exceeding the timeslot; and in response, receive assignment of an additional timeslot to the network node from the gateway.

In some example implementations of the network node of any preceding example implementation, or any combination of any preceding example implementations, the processing circuitry is configured to execute the computer-readable program code to cause the network node to further: receive an additional notification of eviction the network node from the additional timeslot assigned to the network node after a predetermined timeout period in which the network node fails to transmit data in the additional timeslot.

In some example implementations of the network node of any preceding example implementation, or any combination of any preceding example implementations, the processing circuitry is configured to execute the computer-readable program code to cause the network node to further: schedule operation of a power-consuming component of the network node based on the timeslot assigned to the network node.

In some example implementations of the network node of any preceding example implementation, or any combination of any preceding example implementations, the power-consuming component is an output device configured to produce user-perceptible feedback.

In some example implementations of the network node of any preceding example implementation, or any combination of any preceding example implementations, the power-consuming component is a satellite-based navigation system receiver configured to determine a geographical position of the network node.

In some example implementations of the gateway of any preceding example implementation, or any combination of any preceding example implementations, the network node further includes an additional component configured to determine the geographical position of the network node independent of the satellite-based navigation system receiver.

In some example implementations of the network node of any preceding example implementation, or any combination of any preceding example implementations, the processing circuitry is configured to execute the computer-readable program code to cause the network node to further: adjust priority of a data transmission based on a location of the network node or data from an onboard sensor of the network node.

In some example implementations of the gateway of any preceding example implementation, or any combination of any preceding example implementations, the processing circuitry is configured to execute the computer-readable program code to cause the network node to further: transmit data during each timeslot assigned to the network node and transmit other data during other regular or irregular intervals of the epoch.

In some example implementations of the network node of any preceding example implementation, or any combination of any preceding example implementations, the processing circuitry is configured to execute the computer-readable program code to cause the network node to further: send transmissions to other network nodes, or out-of-network devices having known locations; receive responses from the other network nodes or the out-of-network devices, each response including a time of arrival of the transmission at the other network node or the out-of-network device, or a relative signal strength of the other network node or the out-of-network device; perform time-difference-of-arrival as appropriate based on the responses; and send the time-difference-of-arrival or signal strength to the gateway for use to geolocate the network node.

In some example implementations of the network node of any preceding example implementation, or any combination of any preceding example implementations, the processing circuitry is configured to execute the computer-readable program code to cause the network node to further: determine which of the other network nodes or the out-of-network devices based on data from one or more onboard sensors of the network node.

In some example implementations of the network node of any preceding example implementation, or any combination of any preceding example implementations, the data is encrypted based on a unique identifier of the network node, and the unique identifier facilitates accurate routing within the network and a temporary connection identifier is assigned to the network node by the gateway based on the unique identifier.

In some example implementations of the network node of any preceding example implementation, or any combination of any preceding example implementations, the network node caused to transmit data in the timeslot further comprises the network node caused to: receive a data transmission from another network node, and relay the received data transmission from the another network node to the gateway in the timeslot.

In some example implementations of the network node of any preceding example implementation, or any combination of any preceding example implementations, wherein the network node stores data locally until it connects to a gateway, at which point it transmits its data.

Some example implementations provide a network node for a low-power wide-area (LPWA) network, the network node comprising: memory configured to store computer-readable program code; and processing circuitry configured to access the memory and execute the computer-readable program code to cause the network node to at least: memory configured to store computer-readable program code; and processing circuitry configured to access the memory and execute the computer-readable program code to cause the network node to at least: receive a common timing reference from a gateway connected to the LPWA network, the gateway configured to transmit the common timing reference at a constant interval that delineates an epoch including timeslots assignable to network nodes for transmission of data; join the network node to the LPWA network, including the network node caused to receive assignment of a timeslot within the epoch from the gateway configured to assign the timeslot; schedule operation of a power-consuming component of the network node based on the timeslot assigned to the network node.

In some example implementations of the network node of any preceding example implementation, or any combination of any preceding example implementations, the power-consuming component is an output device configured to provide user-perceptible feedback.

In some example implementations of the network node of any preceding example implementation, or any combination of any preceding example implementations, the power-consuming component is a satellite-based navigation system receiver.

In some example implementations of the network node of any preceding example implementation, or any combination of any preceding example implementations, the network node further includes an additional component configured to determine the geographical position of the network node independent of the satellite-based navigation system receiver.

In some example implementations of the network node of any preceding example implementation, or any combination of any preceding example implementations, the processing circuitry is configured to execute the computer-readable program code to cause the network node to further: send a notification to the gateway of a transmission of data exceeding the timeslot; and in response, receive assignment of an additional timeslot to the network node from the gateway.

In some example implementations of the network node of any preceding example implementation, or any combination of any preceding example implementations, the processing circuitry is configured to execute the computer-readable program code to cause the network node to further: receive a notification of eviction the network node from the additional timeslot assigned to the network node after a predetermined timeout period in which the network node fails to transmit data in the additional timeslot.

In some example implementations of the network node of any preceding example implementation, or any combination of any preceding example implementations, the network node caused to transmit data in the timeslot further comprises the network node caused to: receive a data transmission from another network node, and transmit data in the timeslot assigned to the network node, wherein the network node caused to transmit data includes the network node caused to relay the received data transmission from the another network node to the gateway in the timeslot.

Some example implementations provide a low-power wide-area (LPWA) network comprising: a plurality of network nodes; a gateway or a plurality of gateways connected to the plurality of network nodes and configured to assign timeslots within an epoch to the plurality of network nodes; a server computer connected to the gateway and the plurality of network nodes, the server computer configured to execute software to cause the server computer to at least: create a figure-of-merit that indicates connection quality between the gateway or the plurality of gateways and the plurality of network nodes; and based on the figure-of-merit, and instruct the gateway or the plurality of gateways to join or evict a particular network node to or from the gateway or a timeslot in an epoch, assign a particular timeslot in the epoch to the particular network node, instruct the particular network node to operate at a certain update rate or modulation scheme, or instruct the particular network node to switch to another channel, frequency, or gateway.

In some example implementations of the LPWA network of any preceding example implementation, or any combination of any preceding example implementations, the common timing reference is initiated at the gateway.

In some example implementations of the LPWA network of any preceding example implementation, or any combination of any preceding example implementations, the connection quality is based on distance, signal quality, relative load of the gateway, update times, priority of messages from or to a network node, predicted demand, or other past, current or predicted values as required.

In some example implementations of the gateway of any preceding example implementation, or any combination of any preceding example implementations, alerts are configured to add or remove channels within gateways, or add or remove gateways from the LPWA network, based on a measured bandwidth or update rate of the LPWA network.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. For example, unless otherwise indicated, reference something as being a first, second or the like should not be construed to imply a particular order. Also, for example, reference may be made herein to quantitative measures, values, relationships or the like. Unless otherwise stated, any one or more if not all of these may be absolute or approximate to account for acceptable variations that may occur, such as those due to engineering tolerances or the like. As used in the specification and the appended claims, for example, the singular forms "a," "an," "the" and the like include plural referents unless the context clearly dictates otherwise.

Features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

Example implementations of the relevant disclosure relate generally to low-power networking and, in particular, a low-power network node for a low-power, wide area (LPWA) Internet of things (IoT) system that uses time division multiplexing (TDM). The LPWA IoT system and low-power network nodes may be suitable for any of a number of applications, such as tracking tagged objects. In some implementations, at least some of the low-power network nodes are embodied by tags worn by construction or maintenance workers, and the system may be configured for use in tracking those workers. The tags can be used to monitor safety, call for help if a worker is injured, and also monitor worker position around a job site to confirm that only verified individuals are in the appropriate areas. The tags can be used to monitor performance such as time-on-tool or other similar metrics. The tags are connected to applications or algorithms and are read by gateways or relays throughout the job site.

Figure 1:
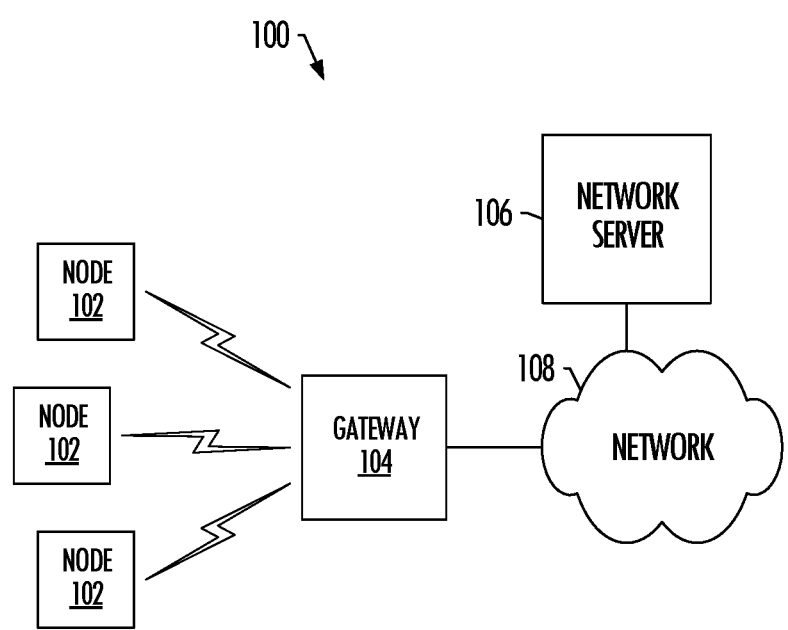
FIG. 1 illustrates a low-power wide area (LPWA) IoT system according to various example implementations of the present disclosure.

FIG. 1 illustrates a LPWA IoT system 100 according to various example implementations of the present disclosure. The system may include one or more of each of a number of different components. As shown, the system includes a number of network nodes 102—sometimes referred to as end devices—connected to a gateway 104, which is configured to communicate with a network server 106 over a network 108 such as a wide area network (WAN) like the Internet. According to example implementations of the present disclosure, the nodes may connect to the gateway according to a suitable low-power, wide area (LPWA) network technology. One example of a suitable technology is LoRa (Long Range), in which case the system may be considered a LoRa-compliant system. In some further examples, the system may be a LoRa-compliant system in a star-of-stars network topology, but with a custom media access control (MAC) layer. In these examples, the system may utilize custom datalink and network layers, and may be a custom time-division multiplexing (TDM) system with dynamic packet size, node connectivity, and priority control to increase bandwidth efficiency. This system should be considered independent from the specific physical layer implementation. Other physical devices may be used for this custom TDM system where data throughput and bandwidth is limiting and the nodes may benefit from increased coordination.

In some examples, gateway 104 is connected or connectable to a low-power wide-area (LPWA) network (which may correspond to network 108). The gateway is configured to transmit a beacon message (which may also be referred to as a common timing reference) at a constant interval that delineates an epoch including timeslots assignable to network nodes 102 for transmission of data and further including a free-for-all interval during which any network node is permitted to transmit data. In some of these examples, the gateway is configured to join a network node to the LPWA network based on the beacon message. The free-for-all interval is also known in the art as a carrier-sense multiple access (CSMA) MAC layer.

The gateway 104 is also configured to join a network node 102 to the LPWA network 108 based on the beacon message. In some of these examples, the gateway is configured to receive a join message transmitted by the network node during the free-for-all interval, the join message including a measure of received signal strength or quality of the beacon message at the network node. The gateway is then configured to assign one or more timeslots in the epoch, a frequency, a channel, or a modulation to the network node based on the measure of received signal strength or other quality as may be configured by the gateway.

In some examples, the gateway 104 is configured to evict the network node 102 from the timeslot assigned to the network node after a predetermined timeout period in which the network node fails to transmit data in the timeslot.

In some examples, the gateway 104 is configured to assign an additional timeslot to the network node 102 in response to a notification from the network node. The gateway can evict the network node from the additional timeslot assigned to the network node after a predetermined timeout period in which the network node fails to transmit data in the additional timeslot.

In some examples, the gateway 104 is configured to join an additional network node 102 to the LPWA network 108, which includes the gateway configured to receive an additional join message transmitted by the additional network node during the free-for-all interval. In these examples, the additional join message includes an additional measure of received signal strength or quality of the beacon message at the additional network node. The gateway is also configured to determine that all of the timeslots assignable to the network nodes are assigned, and create an additional epoch including second timeslots assignable to the network nodes for transmission of data. The gateway is configured to assign a one or more timeslots within the additional epoch, a frequency, a channel, or a modulation to the additional network node.

In some examples, the gateway 104 is configured to dynamically adjust the free-for-all interval based on an amount of data transmitted in respectively the timeslots and the free-for-all interval of the epoch. The gateway is also configured to allow certain ones of the network nodes 102 to transmit data during an entirety of the epoch, and the gateway can limit other of the network nodes to transmit data during other regular or irregular intervals of the epoch. The gateway may also be further configured to implement a synchronized timing reference between all of the network nodes.

In these examples, the data transmitted may be encrypted based on a unique identifier of the network node 102, which will be further explained in later paragraphs. The unique identifier is used to distinguish the network node from an out-of-network device and facilitates accurate routing of data transmissions by the network node within the network 108.

Figure 2:
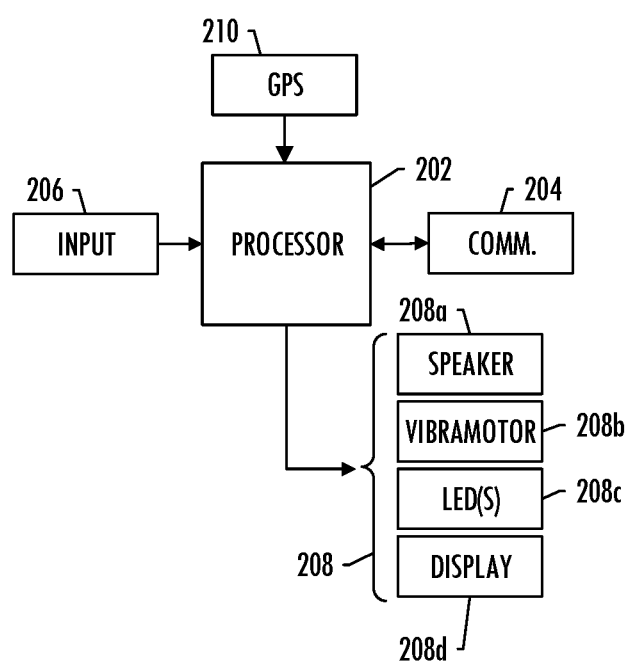
FIG. 2 illustrates a network node according to some example implementations of the present disclosure.

FIG. 2 illustrates a network node 102 according to some example implementations of the present disclosure. As shown, the network node includes a processor 202, which is generally any piece of hardware that is capable of processing information such as, for example, electrical signals, data, computer-readable program code, instructions and the like (generally "computer programs," e.g., software, firmware, etc.), and/or other suitable electronic information.

The processor 202 is composed of an electronic circuit or a collection of electronic circuits some of which may be packaged as an integrated circuit or multiple interconnected integrated circuits (an integrated circuit at times more commonly referred to as a "chip"). In some more particular examples, the processor may be embodied as or otherwise include one or more application-specific integrated circuits (ASICs), field-programmable gate arrays (FPGAs) and the like. In some examples, the processor may be configured to execute computer programs, which may be stored in memory onboard or otherwise coupled to the processor. Thus, while the processor may be configured to perform one or more functions without the aid of a computer program, the processor of various examples may be configured to execute a computer program to perform one or more functions.

As also shown, the processor 202 may be coupled to a number of input/output (I/O) devices for displaying, transmitting and/or receiving information. The I/O devices may include a communications interface 204 configured to transmit and/or receive information, such as to and/or from a gateway 104. The I/O devices may also include one or more user input devices 206, user output devices 208 or the like. Examples of suitable user input devices include a microphone, digital camera, keypad, touch-sensitive surface (separate from or integrated into a touchscreen), biometric sensor or the like. Examples of suitable output devices configured to provide user-perceptible feedback include a loudspeaker 208a, vibramotor 208b, LED 208c and/or display device 208d. And as a further example, the I/O devices may include a satellite-based navigation system receiver like a Global Positioning System (GPS) receiver 210. Other systems may include sensors for the input of vibration, audio, magnetism, etc.

In some examples, the network node 102 is a constrained device in that it has limited power, memory and processing resources. In accordance with example implementations of the present disclosure, use of time division multiple access (TDMA) in a LoRa-compliant system allows the node to go to sleep, wake up, transmit and go back to sleep on a predetermined schedule and time interval, allowing for flexible power usage based on the specific use case required. In this regard, the gateway 104 or a software system that manages the gateway or multiple gateways (e.g., gateway management application) may provide the network node with a specific timeslot when it needs to transmit data. As the transmission of data may be one of the more power intensive requirements, the network node may be configured to go to sleep at times outside the specific timeslot when transmission is not needed. As explained above in the Background section, other systems sleep and transmit, but because their payloads may have 60-80% loss. These other systems therefore end up sending repeat transmissions significantly more than example implementations of the present disclosure. In some examples, data spooling may be performed by the network node to gather network node information when the gateway is unavailable. The network node may store the spooled data when the gateway is unavailable and wait to transmit the data when the gateway becomes available.

The system 100 of example implementations may also enable the sequencing of higher-power uses on the network node 102 when transmission is not occurring, such as use of or updating the speaker 208a, vibramotor 208b, LED(s) 208c and/or display 208d. Additionally, or alternatively, in some examples, the update rate or the internal baud rate of the system may be adjusted based on the accuracy and/or which specific system is needed, further allowing a reduction in power consumption on the network node.

In some examples, the display 208d of the network node 102 may be a low-power display to further benefit from TMDA. Examples of suitable displays include ePaper or low-power liquid crystal displays (LCDs) that have a front light automatically tuned to turn on only when needed.

Additionally, or alternatively, in some examples, the processor 202 of the network node 102 may be a low-power processor, and it may be used for higher current usage activities. In other words, the processor may be one that has low-power and high-power modes, which may increase in accuracy or reliability with increased power. Given the system 100 being able to schedule transmission, power consumption of the network node may be reduced for certain chipsets, such as GPS 210, to only run when certain conditions are met, such as degree of precision being above a certain threshold. Further, one or more of the I/O devices including the user input devices 206 and/or user output devices 208 may be configured to use less power by scheduling their turn on time either when transmission would be asleep or when it is awake. The system may also have the ability to turn off I/O devices with high current loading (such as GPS) and only listen for other signals to ping the device, which may further decrease power consumption such as for geolocation systems such as time difference of arrival (TDOA) geolocation systems. In some of these examples, the network node may operate into a low-power mode and may be awakened to operate in a different mode or to perform a specific task based on receipt of a specific message (e.g., a preconfigured bit stream) on a given channel and/or frequency.

In some examples, a network node 102 is configured to receive a beacon message from a gateway 104 connected to the LPWA network 108, wherein the gateway is configured to transmit the beacon message at a constant interval that delineates an epoch. The epoch includes timeslots assignable to network nodes for transmission of data, as well as a free-for-all interval during which any network node is permitted to transmit data. The timeslot is flexible based on a size of the data transmission, thereby allowing the system 100 maximize bandwidth efficiency by prioritizing data transmissions from network nodes that have high-priority messages, emergency data, and the like. The allocation of time for the free-for-all period versus allocated timeslots is flexible based on a size of the applicable data transmissions, thereby allowing the system 100 maximize bandwidth efficiency by prioritizing data transmissions from network nodes that have high-priority messages, emergency data, and the like. The network node is also configured to join the network node to the LPWA network based on the beacon message, including the network node configured to send a join message to the gateway during the free-for-all time interval. The join message includes a measure of received signal strength or quality of the beacon message at the network node. The network node is further configured to receive assignment of one or more timeslots in the epoch, a frequency, a channel, or a modulation from the gateway. In these examples, the network node is configured to transmit data in the timeslot, and at the frequency, the channel, or the modulation assigned to the network node. In some of these examples, the network node is configured to receive data from another network node and then act as a relay such that the network node relays the received data from the another network node to the gateway in the timeslot. In this manner, network nodes can communicate to each other in order to provide connectivity to the gateway as an alternative to direct communication with the gateway.

In these examples, the network node 102 is configured to receive a notification of eviction of the network node from the timeslot assigned to the network node after a predetermined timeout period in which the network node fails to transmit data in the timeslot.

In these examples, the network node 102 is configured to send a notification to the gateway 104 of a transmission of data exceeding the timeslot. The network node is also configured to receive, in response, an assignment of an additional timeslot to the network node from the gateway.

In these examples, the network node 102 is configured to receive an additional notification of eviction the network node from the additional timeslot assigned to the network node after a predetermined timeout period in which the network node fails to transmit data in the additional timeslot.

In these examples, the network node 102 is configured to schedule operation of a power-consuming component of the network node based on the timeslot assigned to the network node. In some of these examples, operation of the power-consuming component is disabled in the timeslot and enabled outside the timeslot. The network node is also configured to transmit data in the timeslot assigned to the network node, in which the power-consuming component is disabled. In other of these examples, operation of the power-consuming component is enabled in the timeslot and disable outside the timeslot; the network node is also configured to transmit data in the timeslot assigned to the network node, in which the power-consuming component is enabled. The power-consuming component is an output device configured to produce user-perceptible feedback (e.g., one of user output devices 208), or a satellite-based navigation system receiver (e.g., GPS receiver 210) configured to determine a geographical position of the network node. In some of these examples, the network node further includes an additional component configured to determine the geographical position of the network node independent of the satellite-based navigation system receiver, and the additional component is operable in the timeslot in which operation of the satellite-based navigation system receiver is disabled, or vice versa.

In some examples, the network node 102 is configured to adjust priority of a data transmission based on a location of the network node or data from an onboard sensor of the network node. The network node is also configured to transmit data during each timeslot assigned to the network node and transmit other data during other regular or irregular intervals of the epoch.

In some examples, the network node 102 is configured to send transmissions to other network nodes, or out-of-network devices having known locations. The network node is configured to receive responses from the other network nodes or the out-of-network devices, each response including a time of arrival of the transmission at the other network node or the out-of-network device, or a relative signal strength of the other network node or the out-of-network device. In these examples, the network node is configured to perform time-difference-of-arrival based on the responses, and send the time-difference-of-arrival to the gateway for use to geolocate the network node. In these examples, the network node is configured to determine the other network nodes or the out-of-network devices based on data from one or more onboard sensors of the network node.

In some examples, the data transmitted is encrypted based on a unique identifier of the network node 102, and the unique identifier distinguishes the network node from an out-of-network device and facilitates accurate routing of data transmissions by the network node within the network.

In other examples, the network node 102 is configured to receive a beacon message from a gateway 104 connected to the LPWA network 108. The gateway is configured to transmit the beacon message at a constant interval that delineates an epoch, which as explained previously, includes timeslots assignable to network nodes for transmission of data. The network node is also configured to join the network node to the LPWA network, including the network node configured to receive assignment of a timeslot in the epoch from the gateway configured to assign the timeslot. In these other examples, the network node is also configured to schedule operation of a power-consuming component of the network node based on the timeslot assigned to the network node. In some of these other examples, operation of the power-consuming component is disabled in the timeslot and enabled outside the timeslot, or vice versa; the network node is configured to transmit data in the timeslot assigned to the network node, in which the power-consuming component is disabled, or vice versa. In some of these examples, the network node is configured to receive data from another network node and then act as a relay such that the network node relays the received data from the another network node to the gateway in the timeslot. In this manner, network nodes can communicate to each other in order to provide connectivity to the gateway as an alternative to direct communication with the gateway.

In these other examples, the power-consuming component is an output device configured to provide user-perceptible feedback (e.g., one of user output devices 208), or a satellite-based navigation system receiver such as GPS receiver 210. The network node 102 further includes an additional component configured to determine the geographical position of the network node independent of the satellite-based navigation system receiver. And the additional component is operable in the timeslot in which operation of the satellite-based navigation system receiver is disabled, or vice versa.

In these other examples, the network node 102 is configured to send a notification to the gateway 104 of a transmission of data exceeding the timeslot. The network node is also configured to receive, in response, an assignment of an additional timeslot to the network node from the gateway.

In these other examples, the network node 102 is configured to receive a notification of eviction the network node from the additional timeslot assigned to the network node after a predetermined timeout period in which the network node fails to transmit data in the additional timeslot.

As indicated above, in some examples, the system 100 may be a LoRa-compliant system in a star-of-stars network topology, but with a custom media access control (MAC) layer. The system may be a custom TDM system with dynamic packet size, node connectivity and priority control. In this regard, some example implementations may provide a system architecture that includes a network 108 in which the gateway 104 is configured to send and receive packets to and from individual moving network nodes 102. Timing may be achieved by having each gateway configured to transmit a beacon message at a constant interval, and which delineates an epoch. Each beacon message contains an epoch number, as well as any data that needs to be transmitted to a particular network node (unicast), multiple network nodes (multicast), or data that must be transmitted to all network nodes (broadcast).

Each epoch contains a free for all interval during which time any network node 102 can transmit using carrier sense multiple access (CSMA) protocol. If a network node chooses to join a specific gateway 104, the node is configured to transmit a join message (with a connection identifier and a received signal strength indicator (RSSI), and/or other information as may be required) during the free for all interval. In response, and based on the RSSI, the gateway may be configured to assign a specific timeslot, frequency, channel, and modulation. In the event that all the timeslots of an epoch are full, a second or additional epoch may be created with the similar structure as the first, with all epochs defined as a super epoch.

In some examples, the free for all interval of an epoch is dynamically shared between upstream data and downstream data, wherein upstream data is defined as data from the network node 102 to the gateway 104 and downstream data is defined as data from the gateway to the network node. In this regard, a first part of the free for all interval may be dedicated to downstream data and another part may be dedicated to upstream data. When the transmission of downstream data stops during the first part of the free for all interval, any remaining portion of the interval may be used by any network node to communicate upstream data.

Each network node 102 joined to the network 108 may have at least one timeslot available for upstream data during the "super epoch." Should the timeslots allocated to a network node be insufficient to transmit all its data, the node may notify the gateway 104 to assign it more timeslots. If a node is not delivering data in a timeslot after an adjustable amount of time, the gateway may remove (evict) the node from that timeslot and may also transmit an eviction notice to inform the node that it has been removed. If a node has data that is considered "emergency data," the node may transmit that data during the free for all interval. In such a system, various methods may be employed to ensure a common clock (which may also be referred to as a common timing reference, or may be referred to as synchronized clock or a synchronized timing reference) is used across the system to ensure system accuracy.

During a super epoch, each node has a time to transmit data up to gateway. Data down to nodes occur on every epoch while data from nodes occur every super epoch, which has increasing number of epochs as the number of nodes increase. Furthermore, nodes with lower signal strengths in either direction (either upstream or downstream) may be assigned lower data rates (i.e., modulation) and/or wider frequency bands and/or different spread factors. In order to maintain equivalent aggregate throughput, the number of time slots granted could also increase.

In some examples, a gateway management application may be used to coordinate messages between gateways 104 in order to load balance the system 100. In these examples, a figure of merit (FOM) may be created and used to evaluate the connection quality between the gateway 104 and a network node 102. In these examples, FOM is an index that may be based on distance, signal quality, relative load of the gateway, update times, priority of messages from or to a network node, predicted demand, time since last gateway change, or other past, current or predicted values as required. Using the FOM, the system can rank all connections in the network against one another. The FOM may be used to join or evict network nodes to or from a given gateway, or to allocate preferential or longer timeslots to nodes or require nodes to operate with different update rates. Before the gateway management application instructs the gateway to evict a network node, a hysteresis or lag-inducing value may be applied to the network node to ensure that it does not repeatedly switch between gateways. The hysteresis or lag-inducing value is an optimization value that will be learned based on, for example, how often nodes move within the network, thereby changing their RSSI values, with increasing movement causing the hysteresis to go down as the system needs to be load balanced more frequently. The gateway management application may be implemented outside of the gateway 104, such as in a server computer 800. In this manner, the gateway management application may calculate the FOM for each of a plurality of gateways at the same time and make determinations regarding how to optimize system performance.

In some examples, different gateways 104 (not shown) may operate using different frequencies, and the gateway management application may be used to send a signal to a specific gateway at a specific frequency. The specific gateway may pass along this signal to a network node to disconnect from certain gateways and may cause the network node to join other gateways on other frequencies that have fewer network nodes connected thereto, have better signal strength, or are closer in proximity.

The system 100 may, in some examples, use alerts to add to or remove from the network new gateways, or new channels to existing gateways, based on bandwidth usage. Gateways can be added or removed from the network as needed—the server computer 800 can determine, based on the load, whether a gateway should be added or removed and whether a channel of a gateway should be created or terminated. Gateways may also be configured to create or terminate channels to balance the load on other channels as appropriate.

In some examples, data transmitted between the gateway 104 and each joined network node 102 is encrypted. This encryption may use a hardware-based, local unique identifier, which may facilitate accurate routing within the network 108 and allow for smaller identifiers for verification within the network. It may also solve the problem that if an external node not within the network transmits data during a timeslot of a joined network node, the system 100 may be able to distinguish the joined node from the external node. In some of these examples, when a node joins a specific gateway, the gateway may assign a connection identifier to the node, along with the timeslot. The connection identifier may be temporarily unique and decrypted only by the gateway that knows the connection identifier.

In addition to using the MAC and TDM to schedule and transmit optimized data packets between the gateway 104 and network nodes 102, in some examples, the MAC also incorporates scheduling the measurement and specification of TDOA beacons to measure distance from known points such as other fixed-point nodes, gateways or beacons. The system may use current or historical GPS, RSSI values, altimeter or inertial sensors to determine which specific network nodes (which may be beacons) to ping in order to optimize the TDOA measurement. In some examples, this includes pings with burst lengths greater than 1 megahertz to ensure adequate accuracy.

In some examples, the system 100 may utilize multiple, simultaneous methods to ensure position accuracy, entry, and exit into specific zones. This may include using GPS, RSSI values from Wi-Fi or Bluetooth, altimeters and inertial sensors. Using this data, the network node 102, the gateway 104, or its corresponding processing circuitry may use a predicative algorithm, such as the Kalman Filter, to perform accurate state and/or location estimation in replacement of or in addition to triangulation.

Figure 3:
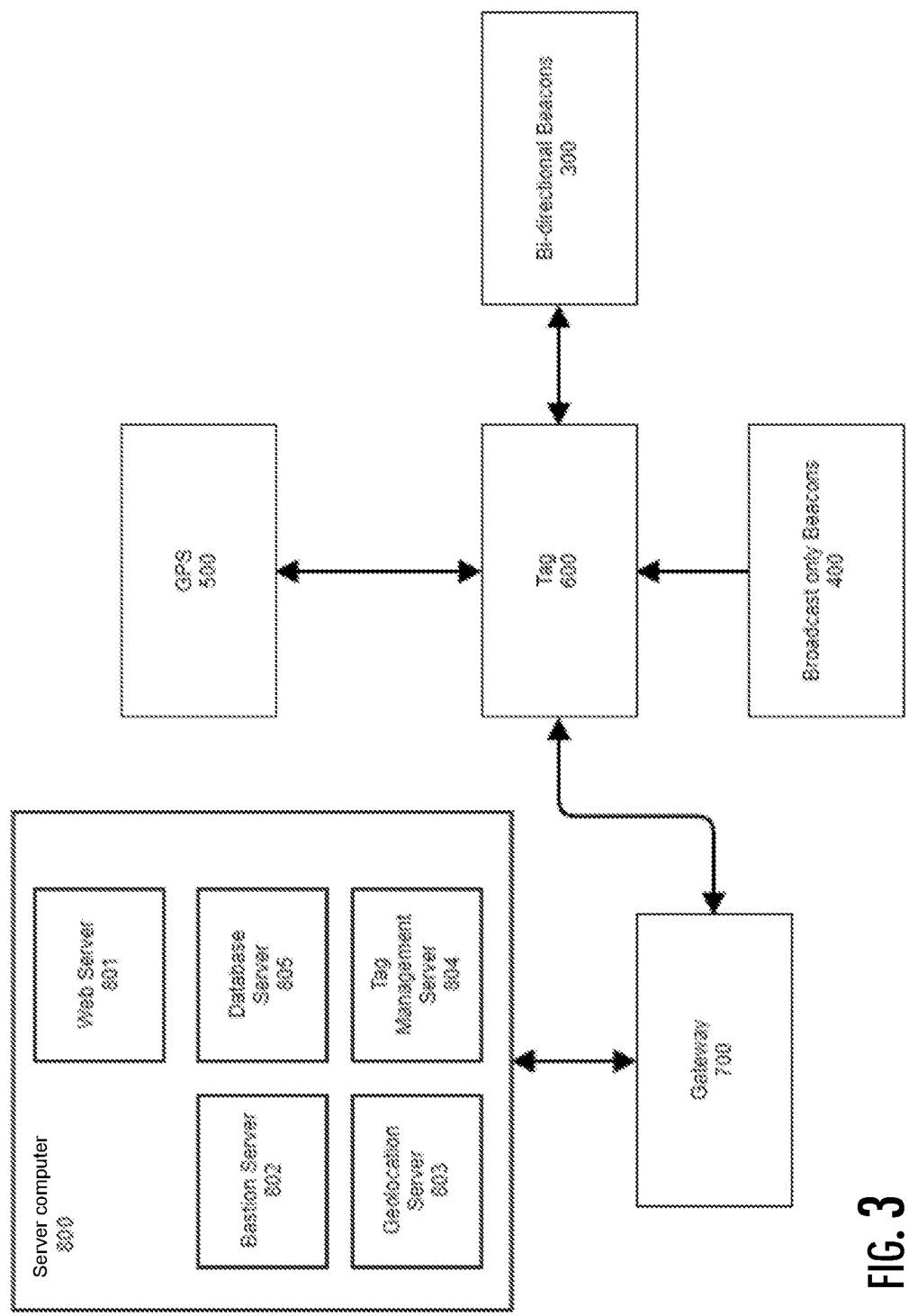
FIG. 3 illustrates a system architecture diagram according to some implementations of the present disclosure.

In this regard, FIG. 3 shows a system architecture diagram of some example implementations including a tag 600 (which may correspond to a network node 102), and a gateway 700 (which may correspond to the gateway 104). In some examples, as illustrated in FIG. 3, the tag 600 will acquire its position from a plurality of GPS satellites 500 and may determine a quality of the GPS signals to determine their usefulness. Should a GPS signal be adequate, the tag will pass this information to the gateway. Should the GPS signal below a certain threshold, the tag may listen for nearby broadcast-only beacons by using protocols such as Wi-Fi or Bluetooth Low Energy (BLE). The signals from these broadcast-only beacons may be filtered to ignore non-system beacons. The tag may then select certain strongest signals from the filtered signals and pass that information back to the gateway.

In order to obtain higher positional accuracy, the tag 600 may send a signal to a nearby bi-directional beacon 300 having a known location where the tag will measure the time difference of arrival and transmit this information to server computer 800 where the server computer can thereby determine the relative location of the tag. The tag may then send a combination of static beacon signals, bi-directional beacon signals, GPS coordinates, user input, self-identifying information and/or onboard sensor data to the gateway 700 for triangulation and other algorithms to occur in the server computer. The server computer is configured to execute software that may include various servers such as bastion servers 802, a dedicated geolocation server 803, database servers 805, tag management server 804 and web servers 801 or any combination thereof or those that can be reasonably extended to perform functions as would be required in the deployment of such a system. Such software can be hosted locally or remotely (e.g., in the cloud). In some instances, the tag may also have a cellular or satellite chip (an integrated circuit) to transmit data directly to the server computer via the Internet.

In some instances, settings may be passed remotely to the gateways, tags, and beacons, such settings including: reset requirements; spread factor (SF) adjustments; update rate adjustments; location methods; communication methods; sensors on/off; user interface on/off settings for buzzers, LEDS, or vibrometers; priorities of various conflicting signals; ping rate; or other items as required. In some instances, the location or identifying information reported between any two or more network nodes 102 may be relative to a known state (such as relative location to a point nearby) to reduce the amount of data sent within the network 108.

In accordance with the above examples, GPS, TDOA, and other location-tracking technologies may be used to determine the location of a tag 600. In some instances, the tag may be unable to determine its location and may require the gateway 700 or software 800 to determine the location of the tag. The tag may transmit data upstream to the gateway including data related to the tag pinging beacons with known location points using TDOA. The tag may send such data with other TDOA values for other known beacons and/or other data points to the gateway or to the software via the Internet so that location tracking (e.g., triangulation, trilateration) can be performed. TDOA may be used in some instance to determine location when GPS or other location-tracking technologies are unavailable. When a tag cannot determine its location, it requires transmitting more data than would otherwise be necessary and is considered a higher priority transmission than other data transmissions by tags that know their locations.

In accordance with the system architecture of FIG. 3, in some examples the server computer is configured to create a figure-of-merit that indicates connection quality between the gateway and the network nodes 102. And based on the figure-of-merit, the server computer causes the gateway to join or evict a particular network node to or from the gateway or a timeslot, assign a particular timeslot to the particular network node, or instruct the particular network node to operate at a certain update rate. The connection quality is based on distance, signal quality, relative load of the gateway, update times, priority of messages from or to a network node, predicted demand, or other past, current or predicted values as required. In these examples, an update rate is the amount of times a given node updates in a given time period (e.g., update per minute). The network may configure a certain, high-priority node to send its data several times a minute while a lower-priority node may be configured to send its data multiple times an hour. Certain pieces of data within a node's transmissions may be configured to have update rates different than others. For example, low-priority data, such as the battery level of the node, may be sent at an update rate of once every 10 transmissions, while location data may be sent during every data transmission. Both data examples can be considered adjustments of update rate. In some examples, a synchronized timing reference is initiated in the gateway.

Figure 4:
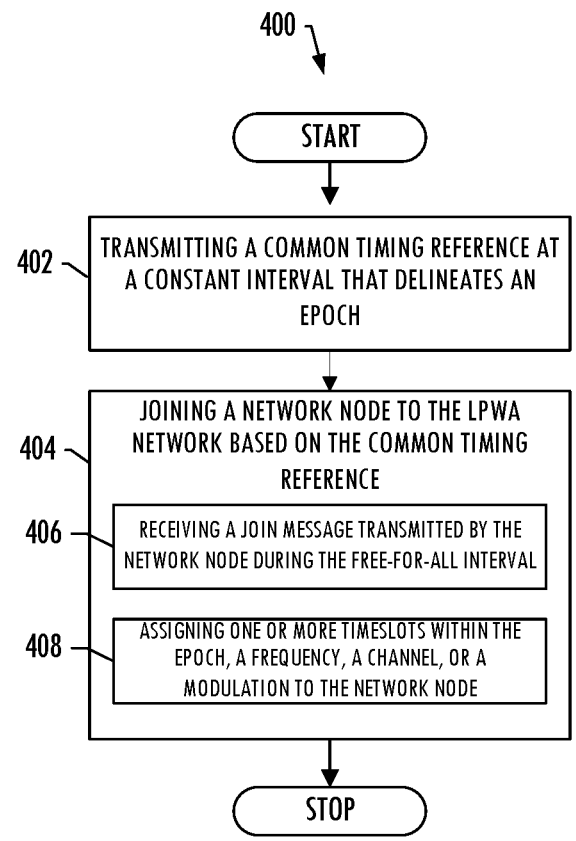
FIGS. 4-7 are flowcharts illustrating various steps in a methods of coordinating communication in an LPWA network, according to example implementations.

FIG. 4 is a flowchart illustrating various steps in a method 400 of coordinating communication in an LPWA network 108. The various steps of the method may be performed by a gateway 104 or other networking device. As shown at block 402, the method comprises transmitting a beacon message at a constant interval that delineates an epoch including timeslots assignable to network nodes for transmission of data and further including a free-for-all interval during which any network node is permitted to transmit data. As shown at block 404, the method includes joining a network node to the LPWA network based on the beacon message. The method further includes receiving a join message transmitted by the network node during the free-for-all interval, the join message including a measure of received signal strength or quality of the beacon message at the network node, as shown at block 406. Additionally, the method includes assigning one or more timeslots within the epoch, a frequency, a channel, or a modulation to the network node based on the measure of received signal strength or other quality as may be configured by the gateway, as shown at block 408.

Figure 5:
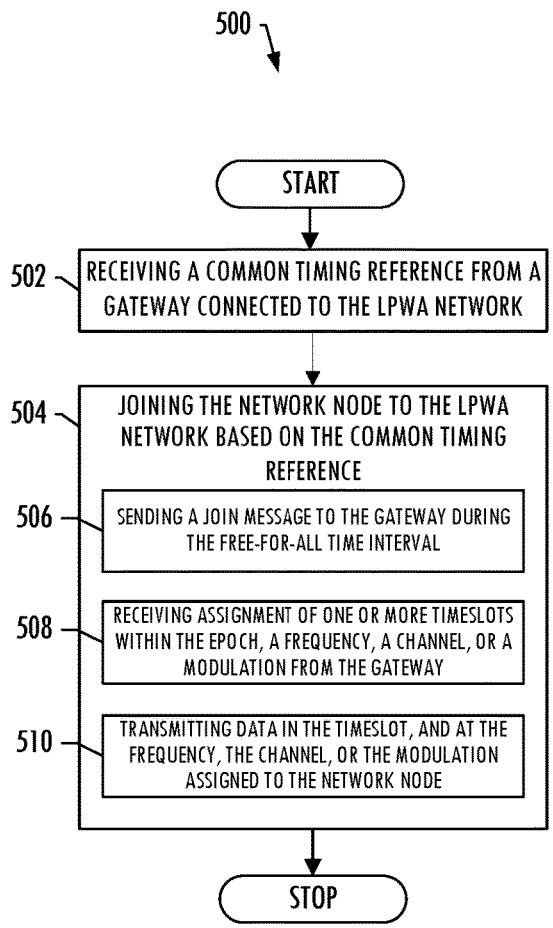
Figure 6:
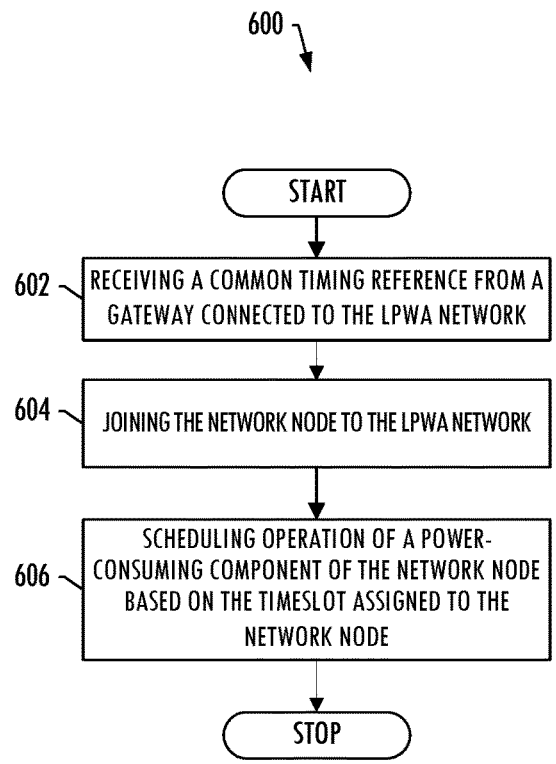

FIGS. 5 and 6 are flowcharts illustrating various steps in methods 500 and 600 of coordinating communication in an LPWA network 108. The various steps of the methods may be performed by a network node 102 or other networking device. For method 500, as shown at block 502 of FIG. 5, the method comprises receiving a beacon message from a gateway connected to the LPWA network, the gateway configured to transmit the beacon message at a constant interval that delineates an epoch including timeslots assignable to network nodes for transmission of data. The epoch further includes a free-for-all interval during which any network node is permitted to transmit data. As shown at block 504, the method includes joining the network node to the LPWA network based on the beacon message, including sending a join message or other high-priority message to the gateway during the free-for-all time interval, as shown at block 506. The join message includes a measure of received signal strength or quality of the beacon message at the network node. The method also includes receiving assignment of one or more timeslots within the epoch, a frequency, a channel, or a modulation from the gateway configured to assign the timeslot, as shown at block 508. The frequency and the modulation are based on the measure of received signal strength or quality. As shown at block 510, the method includes transmitting data in the timeslot, and at the frequency, the channel, or the modulation assigned to the network node.

Referring to FIG. 6, the method 600 includes receiving a beacon message from a gateway connected to the LPWA network, the gateway configured to transmit the beacon message at a constant interval that delineates an epoch including timeslots assignable to network nodes for transmission of data, as shown at block 602. The method also includes joining the network node to the LPWA network, including the network node caused to receive assignment of one or more timeslots within the epoch from the gateway configured to assign the timeslot, as shown at block 604.

As shown at block 606, the method includes scheduling operation of a power-consuming component of the network node based on the timeslot assigned to the network node.

Figure 7:
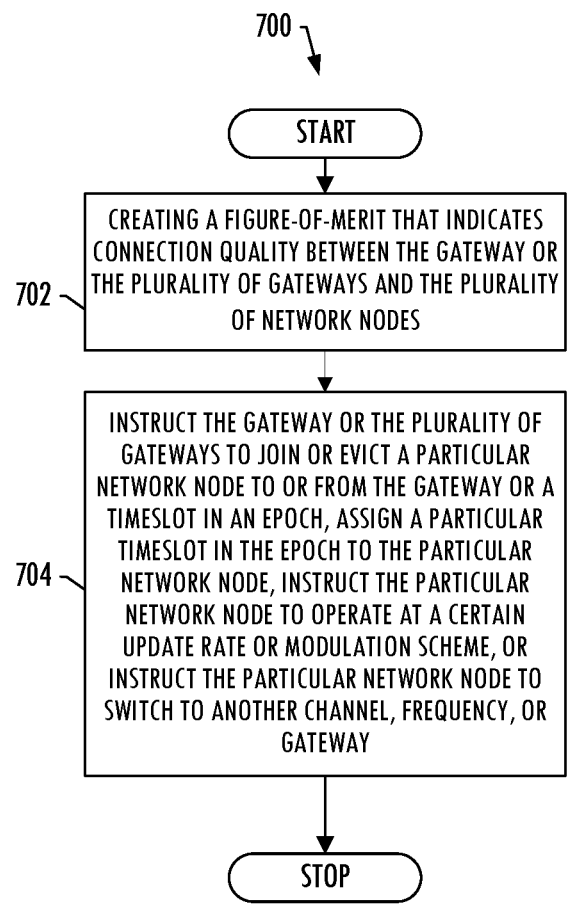

FIG. 7 is a flowchart illustrating various steps in a method 700 for coordinating communication in an LPWA network. The method includes creating a figure-of-merit that indicates connection quality between the gateway or the plurality of gateways and the plurality of network nodes, as shown at block 702. Based on the figure-of-merit, the method further includes instructing the gateway or the plurality of gateways to join or evict a particular network node to or from the gateway or a timeslot in an epoch, as shown at block 704. The method at block 704 also includes, in some examples, assigning a particular timeslot in the epoch to the particular network node, instructing the particular network node to operate at a certain update rate or modulation scheme, or instructing the particular network node to switch to another channel, frequency, or gateway.

According to example implementations of the present disclosure, the system architecture and its various components may be implemented by various means. Means for implementing the system architecture and its various components may include hardware, alone or under direction of one or more computer programs from a computer-readable storage medium. In some examples, components of the system architecture may be embodied by one or more apparatuses configured to function as or otherwise implement the components shown and described herein. In examples involving more than one apparatus, the respective apparatuses may be connected to or otherwise in communication with one another in a number of different manners, such as directly or indirectly via a wired or wireless network or the like.

Figure 8:
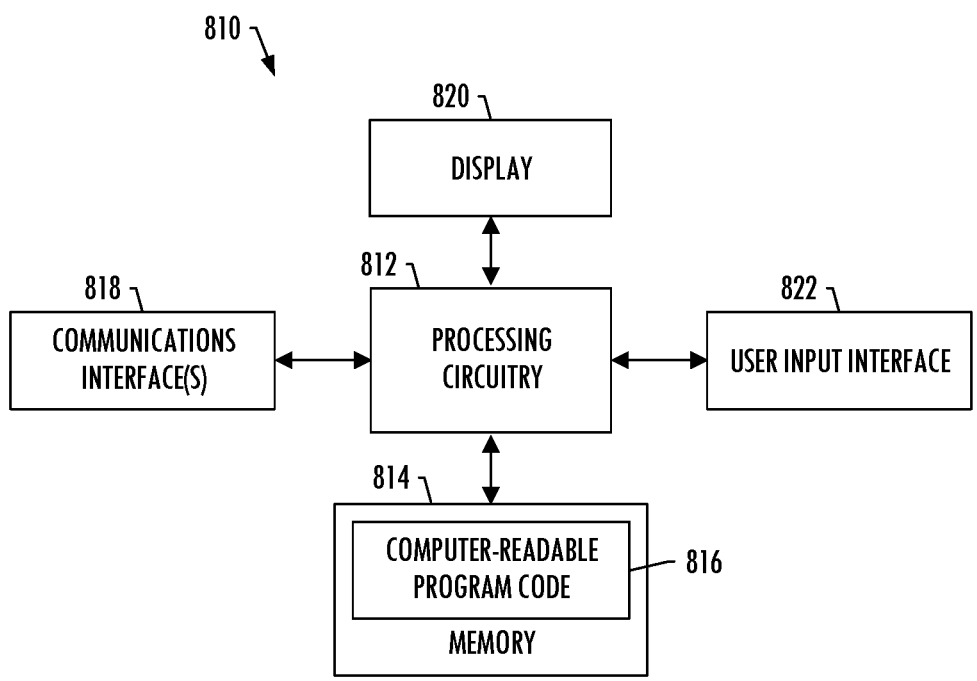
FIG. 8 illustrates an apparatus according to some example implementations.

FIG. 8 illustrates an apparatus 810 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer, networking equipment, an electronic tag or node, an electronic beacon, or the like. The apparatus may include one or more of each of a number of components such as, for example, processing circuitry 812 (e.g., processor unit) connected to a memory 814 (e.g., storage device).

The processing circuitry 812 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 814 (of the same or another apparatus).

The processing circuitry 812 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 814 is generally any piece of computer hardware that is capable of storing information such as, for example, data, computer programs (e.g., computer-readable program code 816) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 814, the processing circuitry 812 may also be connected to one or more interfaces for displaying, transmitting and/or receiving information. The interfaces may include a communications interface 818 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 820 and/or one or more user input interfaces 822 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 810 may include a processing circuitry 812 and a computer-readable storage medium or memory 814 coupled to the processing circuitry, where the processing circuitry is configured to execute computer-readable program code 816 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A gateway connected or connectable to a low-power wide-area (LPWA) network, the gateway comprising:
   memory configured to store computer-readable program code; and
   processing circuitry configured to access the memory and execute the computer-readable program code to cause the gateway to at least:
   transmit a common timing reference at a constant interval that delineates an epoch including timeslots assignable to network nodes for transmission of data and further including a free-for-all interval during which any network node is permitted to transmit data; and
   join a network node to the LPWA network based on the common timing reference, including the gateway caused to:
   receive a join message transmitted by the network node during the free-for-all interval, the join message including a measure of received signal strength or quality of the common timing reference at the network node, and
   assign one or more timeslots within the epoch, a frequency, a channel, or a modulation to the network node based on the measure of received signal strength or other quality as may be configured by the gateway,
   wherein the processing circuitry is configured to execute the computer-readable program code to cause the gateway to further:
   join an additional network node to the LPWA network, including the gateway caused to:
   receive an additional join message transmitted by the additional network node during the free-for-all interval, the additional join message including an additional measure of received signal strength or quality of the common timing reference at the additional network node,
   determine all of the timeslots assignable to the network nodes are assigned, create an additional epoch including additional timeslots assignable to the network nodes for transmission of data, and
   assign one or more timeslots within the additional epoch, a frequency, a channel, or a modulation to the additional network node.

2. The gateway of claim 1, wherein the processing circuitry is configured to execute the computer-readable program code to cause the gateway to further:
   evict the network node from the timeslot assigned to the network node after a predetermined timeout period in which the network node fails to transmit data in the timeslot.

3. The gateway of claim 1, wherein the processing circuitry is configured to execute the computer-readable program code to cause the gateway to further:
   assign an additional timeslot to the network node in response to a notification from the network node.

4. The gateway of claim 3, wherein the processing circuitry is configured to execute the computer-readable program code to cause the gateway to further:
   evict the network node from the additional timeslot assigned to the network node after a predetermined timeout period in which the network node fails to transmit data in the additional timeslot.

5. The gateway of claim 1, wherein the processing circuitry is configured to execute the computer-readable program code to cause the gateway to further:
   dynamically adjust the free-for-all interval based on an amount of data transmitted in respectively the timeslots and the free-for-all interval of the epoch.

6. The gateway of claim 1 wherein a portion of the free for all interval is dedicated to downstream data and another portion of the free for all interval is dedicated to upstream data, and
   wherein when transmission of downstream data stops during the portion of the free for all interval, any remaining part of the portion is used by any of the network nodes to transmit upstream data.

7. The gateway of claim 1, wherein the processing circuitry is configured to execute the computer-readable program code to cause the gateway to further:
   allow certain ones of the network nodes to transmit data during an entirety of the epoch; and
   limit other of the network nodes to transmit data during other regular or irregular intervals of the epoch.

8. The gateway of claim 1, wherein the processing circuitry is configured to execute the computer-readable program code to cause the gateway to further:
   implement the common timing reference between all of the network nodes.

9. The network node of claim 1, wherein the data is encrypted based on a unique identifier of the network node, and
   wherein the unique identifier facilitates accurate routing within the network and a temporary connection identifier is assigned to the network node by the gateway based on the unique identifier.

10. The gateway of claim 1, where in the process the processing is configured to execute the computer-readable program code to cause the gateway to further:
    receive an eviction command from a server computer based on other requirements for network performance.

11. A network node for a low-power wide-area (LPWA) network, the network node comprising:
    memory configured to store computer-readable program code; and
    processing circuitry configured to access the memory and execute the computer-readable program code to cause the network node to at least:
    receive a common timing reference from a gateway connected to the LPWA network, the gateway configured to transmit the common timing reference at a constant interval that delineates an epoch including timeslots assignable to network nodes for transmission of data and further including a free-for-all interval during which any network node is permitted to transmit data;

join the network node to the LPWA network based on the common timing reference, including the network node caused to:

send a join message or other high-priority message to the gateway during the free-for-all time interval, the join message including a measure of received signal strength or quality of the common timing reference at the network node, and receive assignment of one or more timeslots within the epoch, a frequency, a channel, or a modulation from the gateway configured to assign the timeslot, the frequency, the channel, or the modulation based on the measure of received signal strength or other quality as configured by the gateway; and transmit data in the timeslot, and at the frequency, the channel, or the modulation assigned to the network node, wherein the gateway is further configured to:
join an additional network node to the LPWA network;
receive an additional join message transmitted by the additional network node during the free-for-all interval, the additional join message including an additional measure of received signal strength or quality of the common timing reference at the additional network node,
determine all of the timeslots assignable to the network nodes are assigned, create an additional epoch including additional timeslots assignable to the network nodes for transmission of data, and
assign one or more timeslots within the additional epoch, a frequency, a channel, or a modulation to the additional network node.

12. The network node of claim 11, wherein the processing circuitry is configured to execute the computer-readable program code to cause the network node to further:
receive a notification of eviction of the network node from the timeslot assigned to the network node after a predetermined timeout period in which the network node fails to transmit data in the timeslot.

13. The network node of claim 11, wherein the processing circuitry is configured to execute the computer-readable program code to cause the network node to further:
send a notification to the gateway of a transmission of data exceeding the timeslot; and in response,
receive assignment of an additional timeslot to the network node from the gateway.

14. The network node of claim 13, wherein the processing circuitry is configured to execute the computer-readable program code to cause the network node to further:
receive an additional notification of eviction the network node from the additional timeslot assigned to the network node after a predetermined timeout period in which the network node fails to transmit data in the additional timeslot.

15. The network node of claim 11, wherein the processing circuitry is configured to execute the computer-readable program code to cause the network node to further:
schedule operation of a power-consuming component of the network node based on the timeslot assigned to the network node.

16. The network node of claim 15, wherein the power-consuming component is an output device configured to produce user-perceptible feedback.

17. The network node of claim 15, wherein the power-consuming component is a satellite-based navigation system receiver configured to determine a geographical position of the network node.

18. The network node of claim 16, wherein the network node further includes an additional component configured to determine the geographical position of the network node independent of the satellite-based navigation system receiver.

19. The network node of claim 11, wherein the processing circuitry is configured to execute the computer-readable program code to cause the network node to further:
adjust priority of a data transmission based on a location of the network node or data from an onboard sensor of the network node.

20. The network node of claim 11, wherein the processing circuitry is configured to execute the computer-readable program code to cause the network node to further:
transmit data during each timeslot assigned to the network node and transmit other data during other regular or irregular intervals of the epoch.

21. The network node of claim 11, wherein the processing circuitry is configured to execute the computer-readable program code to cause the network node to further:
send transmissions to other network nodes, or out-of-network devices having known locations;
receive responses from the other network nodes or the out-of-network devices, each response including a time of arrival of the transmission at the other network node or the out-of-network device, or a relative signal strength of the other network node or the out-of-network device;
perform time-difference-of-arrival as appropriate based on the responses; and
send the time-difference-of-arrival or signal strength to the gateway for use to geolocate the network node.

22. The network node of claim 21, wherein the processing circuitry is configured to execute the computer-readable program code to cause the network node to further:
determine which of the other network nodes or the out-of-network devices to send transmissions based on data from one or more onboard sensors of the network node.

23. The network node of claim 11, wherein the data is encrypted based on a unique identifier of the network node, and
wherein the unique identifier facilitates accurate routing within the network and a temporary connection identifier is assigned to the network node by the gateway based on the unique identifier.

24. The network node of claim 11, wherein network node caused to transmit data in the timeslot further comprises the network node caused to:
receive a data transmission from another network node, and
relay the received data transmission from the another network node to the gateway in the timeslot.

25. The network node of claim 11, wherein the network node stores data locally until it connects to a gateway, at which point it transmits its data.

26. A network node for a low-power wide-area (LPWA) network, the network node comprising:
memory configured to store computer-readable program code; and processing circuitry configured to access the memory and execute the computer-readable program code to cause the network node to at least:
receive a common timing reference from a gateway connected to the LPWA network, the gateway configured to transmit the common timing reference at a constant interval that delineates an epoch including timeslots assignable to network nodes for transmission of data, the epoch further including a free-for-all interval which any network node is permitted to transmit data;
join the network node to the LPWA network, including the network node caused to receive assignment of one or more timeslots within the epoch from the gateway configured to assign the timeslot;
schedule operation of a power-consuming component of the network node based on the timeslot assigned to the network node,
wherein the gateway is further configured to:
join an additional network node to the LPWA network;
receive an additional join message transmitted by the additional network node during the free-for-all interval, the additional join message including an additional measure of received signal strength or quality of the common timing reference at the additional network node,
determine all of the timeslots assignable to the network nodes are assigned, create an additional epoch including additional timeslots assignable to the network nodes for transmission of data, and
assign one or more timeslots within the additional epoch, a frequency, a channel, or a modulation to the additional network node.

27. The network node of claim 26, wherein the power-consuming component is an output device configured to provide user-perceptible feedback.

28. The network node of claim 26, wherein the power-consuming component is a satellite-based navigation system receiver.

29. The network node of claim 28, wherein the network node further includes an additional component configured to determine the geographical position of the network node independent of the satellite-based navigation system receiver.

30. The network node of claim 26, wherein the processing circuitry is configured to execute the computer-readable program code to cause the network node to further:
send a notification to the gateway of a need for additional time to transmit data; and in response,
receive assignment of an additional timeslot to the network node from the gateway.

31. The network node of claim 28, wherein the processing circuitry is configured to execute the computer-readable program code to cause the network node to further:
receive a notification of eviction the network node from the additional timeslot assigned to the network node after a predetermined timeout period in which the network node fails to transmit data in the additional timeslot.

32. The network node of claim 26, wherein the processing circuitry is configured to execute the computer-readable program code to cause the network node to further:
receive a data transmission from another network node, and
transmit data in the timeslot assigned to the network node, wherein the network node caused to transmit data includes the network node caused to relay the received data transmission from the another network node to the gateway in the timeslot.

33. A low-power wide-area (LPWA) network comprising:
a plurality of network nodes;
a gateway or a plurality of gateways connected to the plurality of network nodes and configured to:
transmit a common timing reference at a constant interval that delineates an epoch including timeslots assignable to network nodes for transmission of data and further including a free-for-all interval during which any network node is permitted to transmit data; and
assign timeslots within the epoch to the plurality of network nodes;
a server computer connected to the gateway and the plurality of network nodes, the server computer configured to execute software to cause the server computer to at least:
create a figure-of-merit that indicates connection quality between the gateway or the plurality of gateways and the plurality of network nodes; and based on the figure-of-merit,
instruct the gateway or the plurality of gateways to join or evict a particular network node to or from the gateway or a timeslot in an epoch, assign a particular timeslot in the epoch to the particular network node, instruct the particular network node to operate at a certain update rate or modulation scheme, or instruct the particular network node to switch to another channel, frequency, or gateway,
wherein the gateway or the plurality of gateways is further configured to:
join an additional network node to the LPWA network;
receive an additional join message transmitted by the additional network node during the free-for-all interval, the additional join message including an additional measure of received signal strength or quality of the common timing reference at the additional network node,
determine all of the timeslots assignable to the network nodes are assigned, create an additional epoch including additional timeslots assignable to the network nodes for transmission of data, and
assign one or more timeslots within the additional epoch, a frequency, a channel, or a modulation to the additional network node.

34. The LPWA network of claim 33, wherein the connection quality is based on distance, signal quality, relative load of the gateway, update times, priority of messages from or to a network node, predicted demand, or other past, current or predicted values as required.

35. The LPWA network of claim 33, wherein alerts are configured to add or remove channels within gateways, or add or remove gateways from the LPWA network, based on a measured bandwidth or update rate of the LPWA network.

* * * * *